United States Patent
Omata et al.

[11] Patent Number: 6,067,114
[45] Date of Patent: May 23, 2000

[54] DETECTING COMPOSITIONAL CHANGE IN IMAGE

[75] Inventors: Kyoichi Omata, Tanashi; Manabu Kiri, Machida; Toshiki Miyano, Yokohama, all of Japan

[73] Assignee: Eastman Kodak Company, Rochester, N.Y.

[21] Appl. No.: 08/736,640

[22] Filed: Oct. 24, 1996

[30] Foreign Application Priority Data

Mar. 5, 1996 [JP] Japan .................................. 8-047025

[51] Int. Cl.$^7$ .................................................. G03B 13/00
[52] U.S. Cl. .......................... 348/345; 348/347; 348/354
[58] Field of Search ................................... 348/345, 354, 348/353, 349, 169, 171, 347, 362, 363, 364, 365

[56] References Cited

U.S. PATENT DOCUMENTS

| | | | |
|---|---|---|---|
| 5,212,557 | 5/1993 | Ueda | 348/347 |
| 5,341,169 | 8/1994 | Kaneda et al. | 348/354 |
| 5,343,246 | 8/1994 | Arai et al. | 348/354 |
| 5,422,671 | 6/1995 | Yamada et al. | 348/345 |
| 5,703,644 | 12/1997 | Mori et al. | 348/363 |
| 5,920,349 | 7/1999 | Okino et al. | 348/354 |

*Primary Examiner*—Tuan Ho
*Assistant Examiner*—Luong Nguyen
*Attorney, Agent, or Firm*—David M. Woods

[57] ABSTRACT

A method obtains an electrical signal from the photoelectric detector, which signal corresponds to the illumination of the image formed by the focusing lens. The image screen is divided into a plurality of subdivision areas. The method then calculates for the respective subdivision areas a focus evaluation value representative of a high frequency component contained in the electrical signal and a brightness value representative of a brightness of the image. The subdivision areas are sorted in accordance with a object distance classification. The method weights with different weights the subdivision areas on the basis of the subdivision area to which a main object belongs. Variations in the focus evaluation and brightness values are calculated by comparing the values after a focus and the values for an in-focus image. Compositional changes are detected based on the weights and the variation in the focus evaluation and brightness values.

10 Claims, 8 Drawing Sheets

| | | | | | | | |
|---|---|---|---|---|---|---|---|
| | CL1 | CL1 | CL1 | | | | |
| | CL1 | CL1 | CL1 | | CL2 | CL2 | |
| | CL1 | CL1 | CL1 | | CL2 | CL2 | |
| | CL2 | CL2 | | | CL2 | CL2 | |
| | | CL2 | CL2 | | CL2 | CL2 | |

DETECTING COMPOSITIONAL CHANGE IN IMAGE

FIELD OF THE INVENTION

The present invention relates to a method of detecting a compositional change in an image which is employed in tracking an object with imaging devices with automatic focusing such as electronic still cameras. The imaging devices may include a photoelectric detector capable of converting an image formed by a focusing lens into an electrical signal corresponding to the illuminance of the image and focusing mechanism for calculating a focus evaluation value representative of a high frequency component contained in the electrical signal so as to focus the image by moving the focusing lens in accordance with the focus evaluation value.

BACKGROUND OF THE INVENTION

Imaging devices with automatic focusing have conventionally adjusted the focusing degree of a focusing lens on the basis of an object captured in a focus evaluation area defined in a central portion of the image screen.

The conventional devices fix a focus evaluation area in a central portion of the image screen, so that the focusing lens focuses the background or foreground within the focus evaluation area when the object moves toward an edge of the screen out of the focus evaluation area. In this condition the operator cannot focus a main object so the main object is pictured as a blurry image.

Several methods have been proposed to overcome such shortcoming. An operator may sometimes use a joystick for specifying a main object the operator intends to focus, or an eye point of an operator is sometimes detected to automatically track a main object. These methods require provision of additional hardware for object tracking.

SUMMARY OF THE INVENTION

It is accordingly an object of the present invention to provide a method of detecting a compositional change in an image, in which method a compositional change can reliably be detected in the image screen so as to keep tracking the object without additional hardware.

According to a first aspect of the present invention, there is provided a method of detecting a compositional change in an image, comprising: obtaining an electrical signal corresponding to an illuminance of the image formed by a focusing lens using a photoelectric detector; dividing the image into a plurality of subdivision areas; calculating, for each of the subdivision areas, a focus evaluation value representative of an amount of high frequency component contained in the electrical signal and a brightness value representative of a brightness of the image; storing as reference values a focus evaluation value and a brightness value of the image in focus; sorting the subdivision areas according to an object distance classification; weighting with different weights the subdivision areas in classes of the object distance classification based on a main subdivision area to which a main object belongs; comparing the focus evaluation and brightness values after a focus with the reference values so as to calculate variation in the focus evaluation and brightness values; and detecting a compositional change based on the weights as well as the variation in the focus evaluation and brightness values.

With the above method, a compositional change can accurately and reliably be detected so that a continuous focus can be achieved on a main object which an operator intends to focus.

In the above method, the extents of the classes in the object distance classification may be changed at least in accordance with a focal length or diaphragm stop of the focusing lens.

In addition, the method may further comprise: calculating an object distance for each subdivision area based on said focus evaluation value; grouping the subdivision areas based on the object distances; and specifying the main subdivision area based on the result of said grouping.

In weighting, an identical weight may be set for the main subdivision area and for a subdivision area adjacent the main subdivision area for containing a parallel object at an identical distance to the main object.

In weighting, the weights may be changed at least in accordance with a focal length or diaphragm stop of the focusing lens.

In weighting, an isolated subdivision area and a bulk of subdivision areas are distinguished in the subdivision areas including a parallel object at an identical distance to the main object.

The reference values can be average values of the focus evaluation and brightness values for a plurality of images succeeding the image in focus.

Upon detection of a compositional change, the focusing lens can be moved over a partial range including the lens position for focusing the image, object distances for the respective subdivision areas are calculated based on focus evaluation values obtained during movement of the focusing lens, the subdivision areas are grouped based on the object distances, and a main subdivision area to which the main object belongs is specified based on the result of said grouping.

The partial range can be determined at least in accordance with a focal length or diaphragm stop of the focusing lens.

Further, upon detection of a compositional change, an amount of movement of the object can be detected on the basis of correlation between color information for a plurality of pixels in an image in a previous focus and color information for corresponding pixels in an image at the detection, and the main subdivision area is specified based on the amount of movement.

BRIEF DESCRIPTION OF THE DRAWINGS

The above and other objects, features and advantages will be apparent from the following detailed description taken in conjunction with the accompanying drawings, wherein.

DETAILED DESCRIPTION OF THE INVENTION

Figure 1:
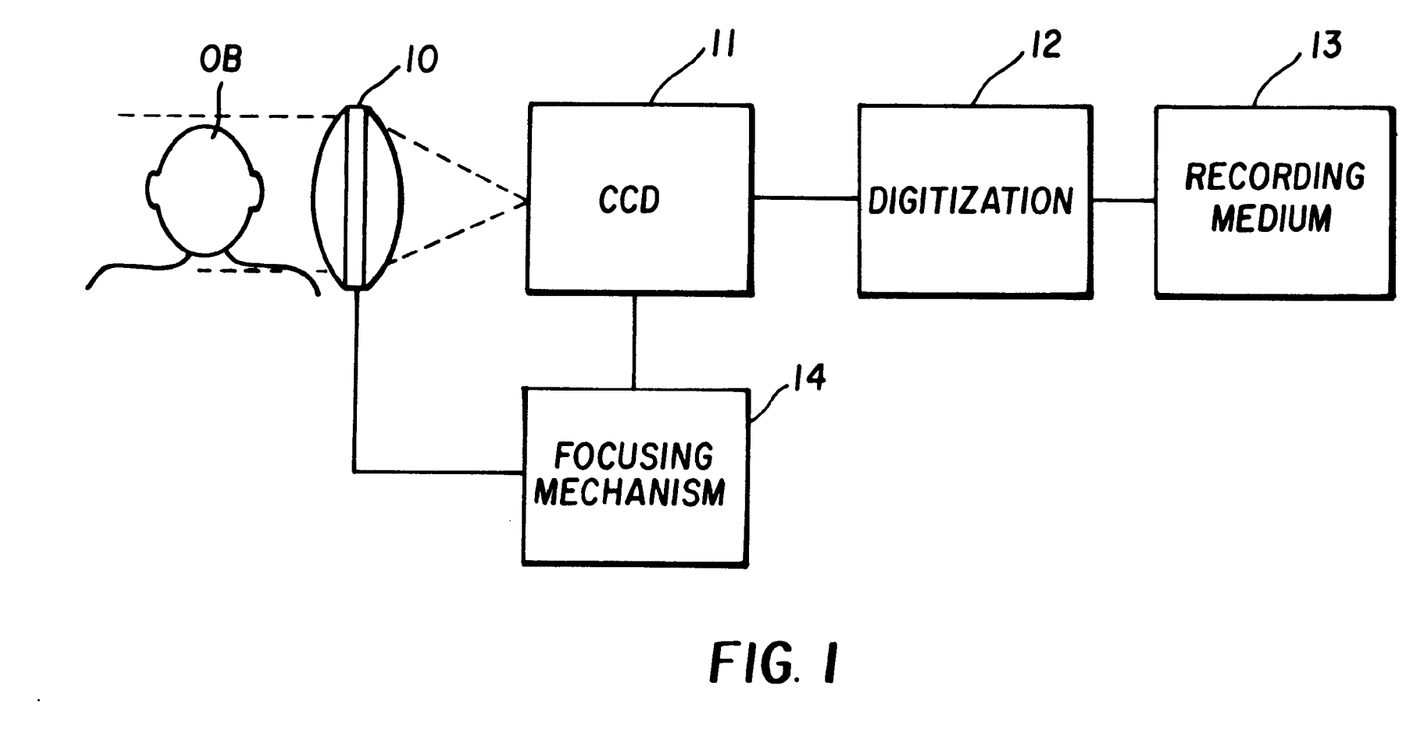
FIG. 1 illustrates an overall structure of an electronic still camera employing an automatic focusing apparatus according to the present invention.

FIG. 1 illustrates a schematic overall structure of an automatic focusing imaging device according to one embodiment of the present invention. The imaging device with automatic focusing, i.e., an electronic still camera SC includes a focusing lens 10 for capturing an image of an object OB at an appropriate lens position and a CCD 11 serving as a photoelectric detector which converts the image formed thereon through the focusing lens 10 into an electrical signal corresponding to the illuminance of the image. The image captured by the CCD 11 is converted to a digital signal, e.g., by an A/D converter 12, and then stored in a recording medium 13 such as a memory card.

Figure 2:
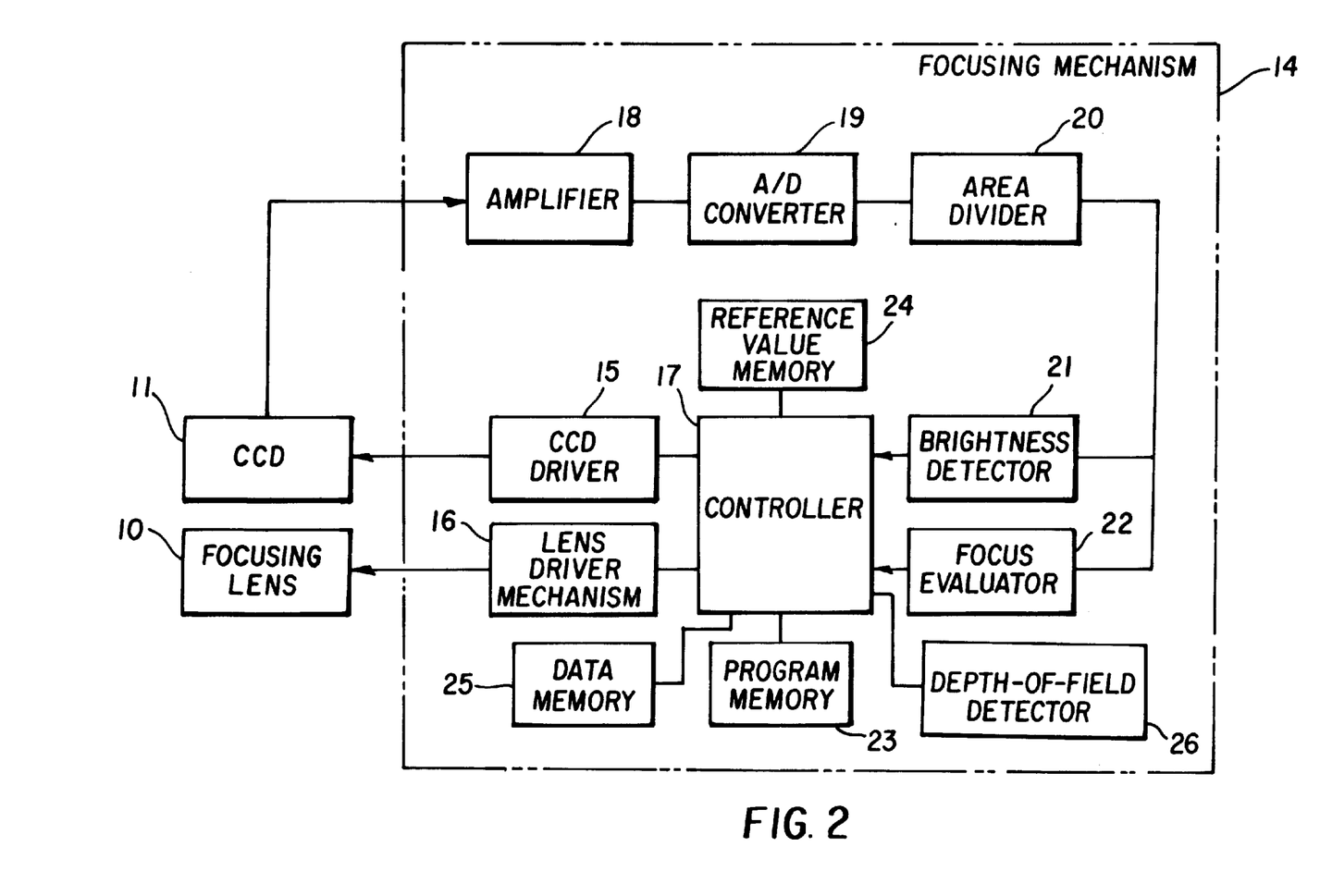
FIG. 2 is a block diagram illustrating a circuit structure of a focusing mechanism.

A focusing mechanism 14 causes the focusing lens 10 to focus the image. The focusing mechanism 14 comprises a CCD driver 15 for supplying a drive signal to the CCD 11, a lens driver mechanism 16 for moving the focusing lens 10 back and forth along the optical axis of the lens 10, and a controller 17 for controlling the CCD driver 15 and the lens driver mechanism 16. The CCD 11 outputs, under the control of the controller 17, a serial signal sequence, that is, a current having a magnitude corresponding to the illuminance of each pixel from CCD 11 in response to the drive signal from CCD driver 15.

An amplifier 18 amplifies the signal sequence from the CCD 11. The amplified electrical signal is linearly converted into a digital signal by an A/D converter 19. An area divider 20 divides the image into a plurality of subdivision areas. The converted digital signals are output from the area divider 20 in sequence for distinguishing subdivision areas. The output digital signal is supplied to a brightness evaluator 21 and a focus evaluator 22. The brightness evaluator 21 calculates a brightness value representative of a brightness of the image for each subdivision area on the basis of the supplied digital signal. The focus evaluator 22 calculates a focus evaluation value representative of the amount of high frequency component contained in the electrical signal for each subdivision area on the basis of the supplied digital signal. The focus evaluation value is obtained by summing the amount of high frequency component for each pixel within the subdivision area. The controller 17 estimates a focus of the focusing lens 10 at a lens position allowing the maximum focus evaluation value. The estimation utilizes the fact that an electrical signal from the CCD includes a larger amount of high frequency component for an in-focus image than for an out-of-focus image.

The controller 17 processes the focus evaluation and brightness values in accordance with a program stored in a program memory 23. The controller 17 has a connection to a reference value memory 24 for storing a focus evaluation value and a brightness value for the image in focus, a data memory 25 for storing various types of calculated data, and a depth-of-field detector 26 for detecting a depth of field at least on the basis of a focal length or diaphragm stop of the focusing lens 10. While the program memory 23 as well as the reference value memory 24 and data memory 25 are separately provided in this embodiment, a single memory device may be used in common for these memory purposes. In place of the depth-of-field detector 26, the processing of the controller 17 may serve to detect a depth of field by using a predetermined focal length depending on lens positions or a predetermined diaphragm stop depending on the brightness.

Figure 3:
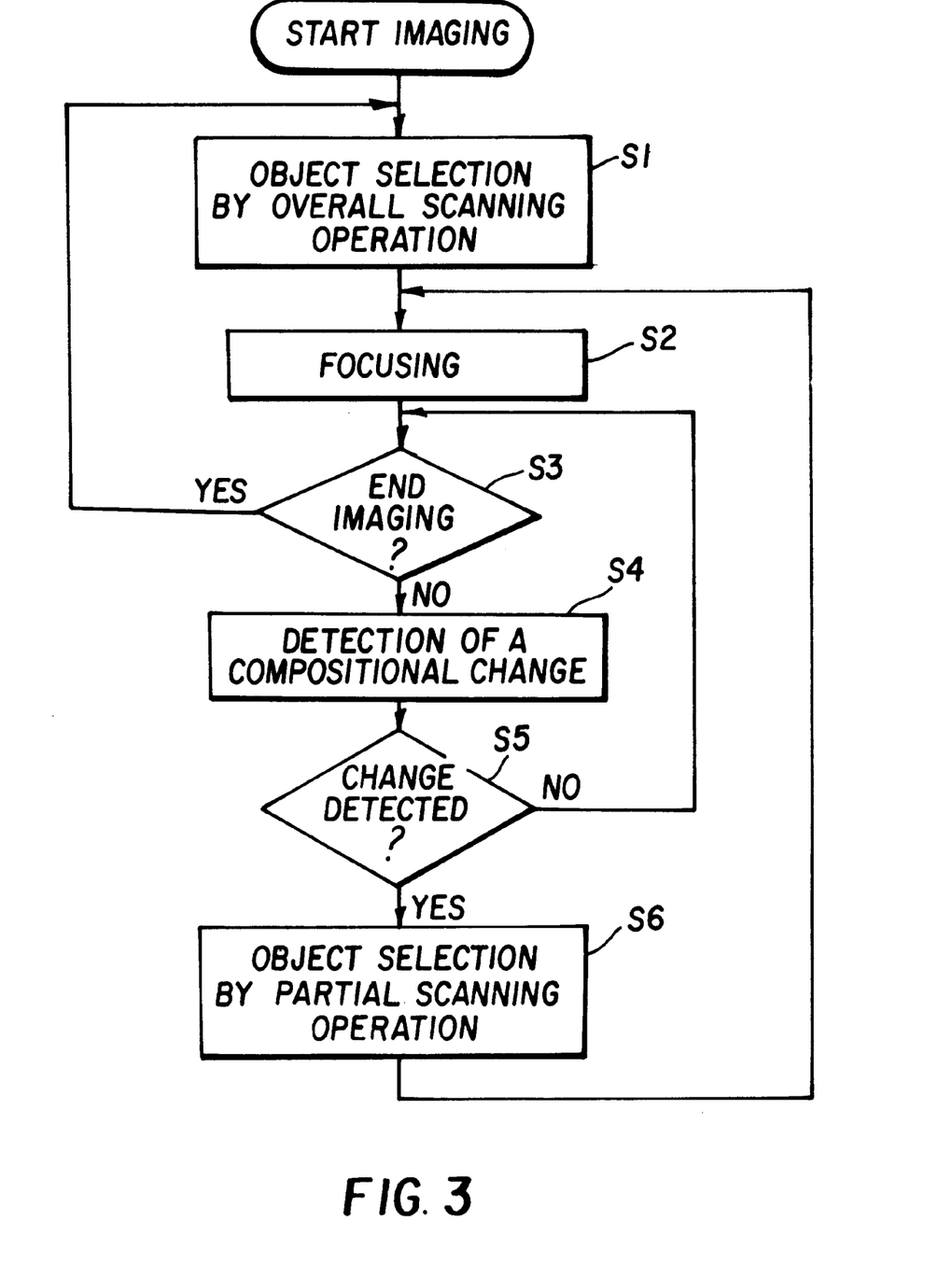
FIG. 3 is a flowchart illustrating the procedure of imaging.

Referring to FIG. 3, the method of detecting compositional changes in an image will be described in accordance with the present embodiment. Upon starting of imaging, a first selection of an object is executed by an overall scanning operation at the first step S1. The overall scanning operation allows the focusing lens 10 to move from the nearest point to the infinite point at least once. A main object can be selected out of the composition of the image screen during the movement of the focusing lens 10. Once a main object is selected, the focusing of the image is executed at the second step S2. The focusing causes the focusing lens 10 to focus the image of the selected main object. When an operator picks up the image upon the establishment of a focus at the third step S3, the image is recorded to the recording medium 13 shown in FIG. 1. Another imaging can be started by returning to the first step S1.

When the operator delays picking up the image after the image has been in focus, the detection of a compositional change is executed at the fourth step S4. The detection serves to maintain the focus for the selected main object by detecting a compositional change such as displacement of the object or attitude change in the image. For example, the detection can easily determine a displacement of a main object from the center to an edge in the image screen, an exchange of main objects by introducing another object into the image screen, and a back and forth movement of a main object along the optical axis of the focusing lens 10 at the center of the image screen.

If it is determined at the fifth step S5 that no compositional change occurs, the processing returns to the third step S3 so as to determine whether or not an image pick-up has been completed. The detection of a compositional change is repeated until image pick-up has been completed. On the other hand, if it is determined that a compositional change occurs, the processing proceeds to the sixth step S6 where the selection of an object is again executed by a partial scanning operation. In this partial scanning operation, the focusing lens 10 is moved over a partial range which includes the lens position having a focus previously established, for example, a partial range extending evenly in back and forth directions from such lens position. The extent of such a partial range is determined by the depth of field which is represented at least by a focal length or diaphragm stop of the focusing lens 10. For example, the extent of movement is set larger if the depth of field is deep and smaller if the depth of field is shallow.

The second selection of an object by a partial scanning operation in the above manner enables continuous tracking of a main object in response to a compositional change in the image. Besides, since the extent of movement is set according to the depth of field, image blurs can be minimized during focusing and the second selection of a main object can also be executed quickly.

Figure 4:
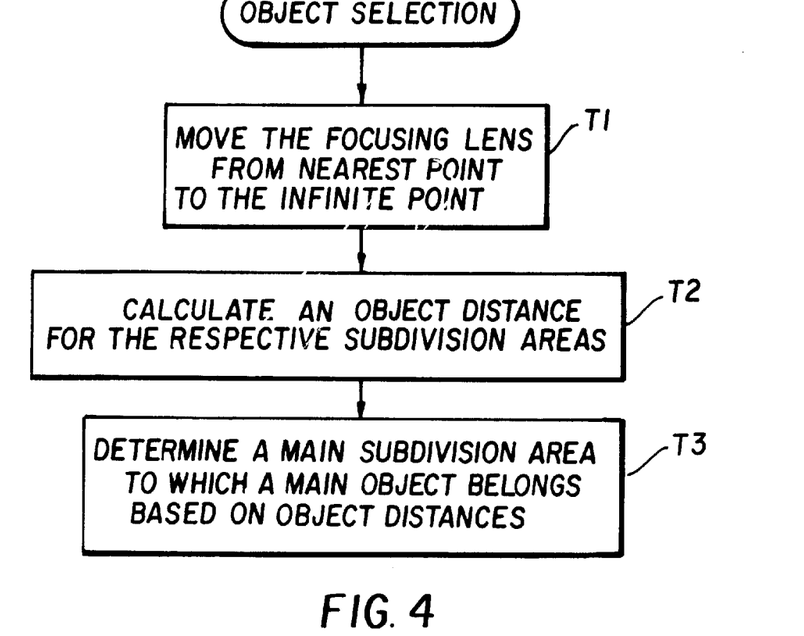
FIG. 4 is a flowchart illustrating the procedure of object selection.

Referring to FIG. 4, the selection of an object by overall scanning operation will be described in detail. The controller 17 moves at the first step T1 the focusing lens 10 with the lens driver mechanism 16 from the nearest point to the infinite point at a constant velocity. During the movement of the focusing lens 10, the controller 17 repeatedly causes the CCD 11 to output at preset intervals an electrical signal corresponding to the illuminance of the image. The focus evaluator 22 calculates a focus evaluation value representative of a high frequency component based on the output electrical signal. The brightness evaluator 21 similarly calculates a brightness value representative of a brightness of the image. A focus evaluation and a brightness value are obtained for the respective subdivision areas by the operation of area divider 20. Specifically, a focus evaluation and a brightness value for the respective subdivision areas are obtained for a plurality of images along the time base.

Figure 5:
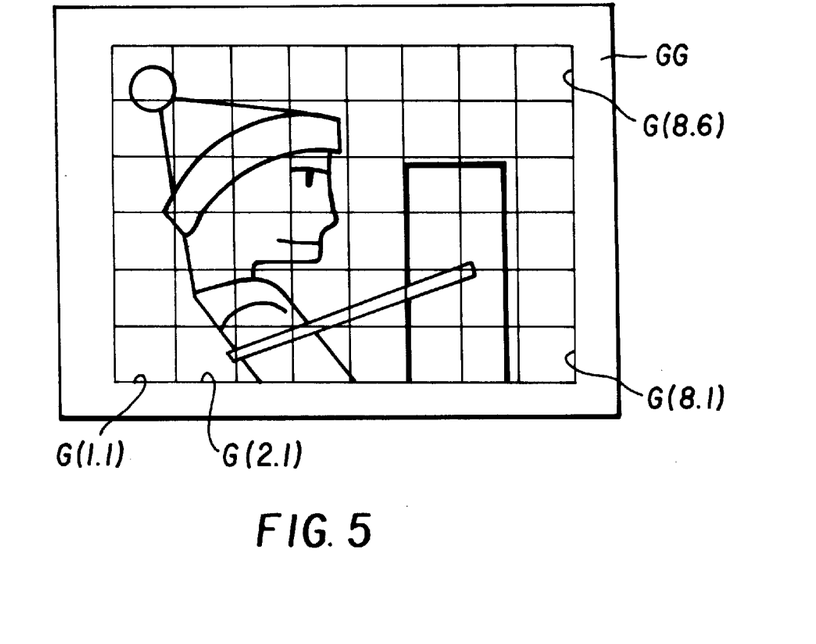
FIG. 5 illustrates one example of an image.

The controller 17 calculates at the second step T2 an object distance for the respective subdivision areas based on the detection of a focus. The controller 17 stores to the data memory 25 a lens position allowing the maximum focus evaluation value for the respective subdivision areas. For example, assume that an operator intends to pick up an image shown in FIG. 5. An image GG is divided into subdivision areas G(1,1) to G(8,6) in a matrix form by the area divider 20. Object distance data is obtained by calculation of object distances as shown in FIG. 5.

The controller 17 determines at the third step T3, based on the object distances, a main subdivision area to which a main object belongs. The controller 17 first groups the subdivision areas based on the object distances. The controller 17 makes a determination based on the result of the grouping the subdivision area G(3,4) surrounded by the subdivision areas G(2,3) to G(4,5) having an identical object distance.

Figure 7:
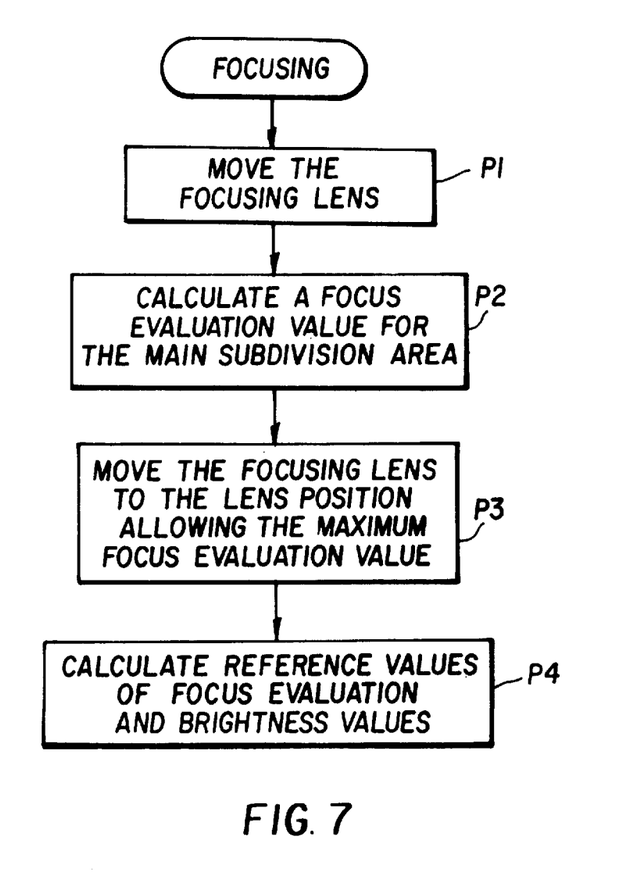
FIG. 7 is a flowchart illustrating the procedure of focusing.

Referring to FIG. 7, the focusing operation is next described in detail. The controller 17 moves at the first step P1 the focusing lens 10 around the object distance of the selected subdivision area G(3,4). During the movement of the lens 10, the CCD 11 is caused to output electrical signals while the focus evaluator 22 is caused to calculate focus evaluation values as shown in the second step P2. A lens position allowing the maximum focus evaluation value is calculated based on the output focus evaluation value and the focusing lens 10 is positioned at the calculated lens position at the third step P3. The detection of a lens position allowing the maximum focus evaluation value may be a determination of the maximum focus evaluation value by sequentially calculating focus evaluation values over the entire range which the focusing lens 10 can move or a search of a reduction in the focus evaluation value to return the focusing lens 10 to the lens position allowing the peak in the focus evaluation value. After a focus, the movement of the focusing lens 10 is terminated.

The controller 17 then stores at the fourth step P4 the focus evaluation and brightness value of the infocus image as reference values to the reference value memory 24 in preparation for succeeding detection of a compositional change. Upon storing reference values, it is preferable to average focus evaluation and brightness values of a plurality of images succeeding the in-focus image. Averaging values enables the elimination of influences such as flickering of a fluorescent lamp or a blurred image due to camera movement.

Figure 6:
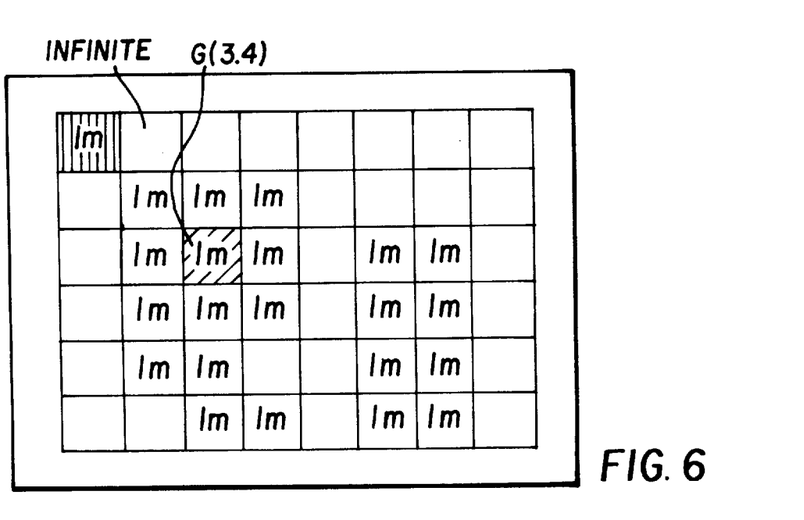
FIG. 6 illustrates the object distances for the respective subdivision areas.
Figure 8:
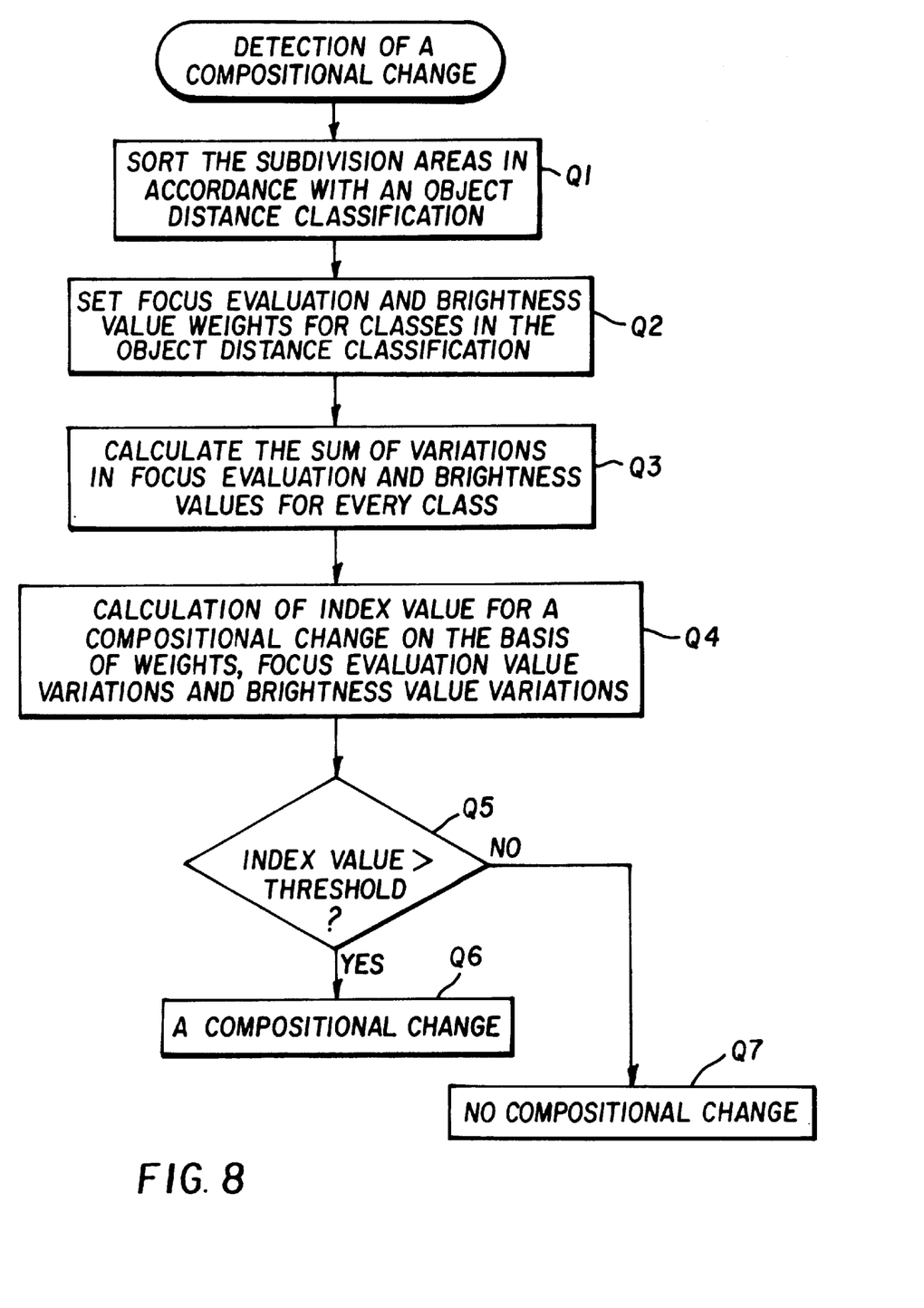
FIG. 8 is a flowchart illustrating the procedure of detection of a compositional change.
Figure 9:
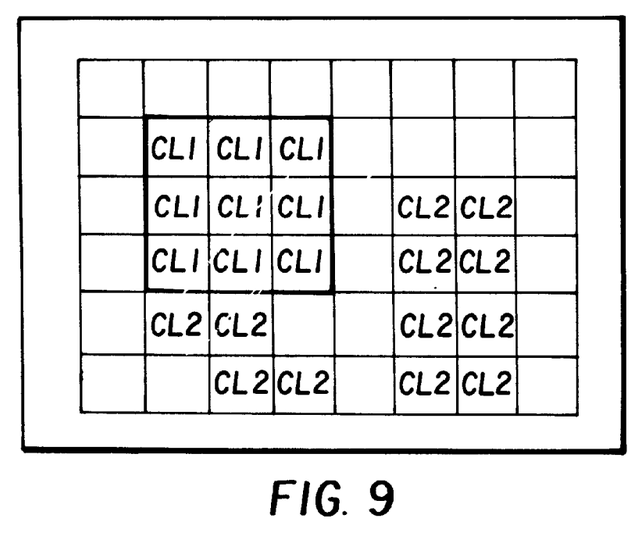
FIG. 9 illustrates the sorted subdivision areas.

Referring to FIG. 8, the detection of a compositional change is next described in detail. The controller 17 sorts in the first step Q1 the subdivision areas in accordance with an object distance classification. For example, the first class CL1 includes, as shown in FIG. 9, the main subdivision area G(3,4) to which the main object belongs, and the subdivision areas in contact with the main subdivision area G(3,4) within a bold line in FIG. 6 for including objects at an identical object distance to the main object. The first class CL1 serves to capture the main object and to determine its size. The second class CL2 includes the subdivision areas which include objects at the identical object distance to the main object. Note that an isolated subdivision area G(1,6) is distinguished from a bulk of the subdivision areas of the second class CL2. The second class CL2 enables a parallel object to be found. The third class CL3 includes the subdivision areas which are not sorted into the first and second classes CL1, CL2, as shown by a blank in FIG. 9. The distinguished isolated subdivision area G(1,6) is labelled with the third class CL3. The extents of the respective classes in the object distance classification is determined in accordance with the depth of field.

The controller 17 sets at the second step Q2 focus evaluation value weights WF1, WF2, WF3 and brightness value weights WY1, WY2, WY3 for the respective classes CL1, CL2, CL3 in the object distance classification. A maximum weight is assigned to the subdivision areas of the first class CL1. A smaller weight is assigned to the second class CL2. A minimum weight is assigned to the third class CL3. All of the weights can be varied according to the depth of field. In other words, since the depth of field is proportional to the square of focal length $f$ and inversely proportional to diaphragm stop $F$, the weight is determined by $W=a+bf^2/F$ where $a$ and $b$ are constants. Different weights are assigned to the respective class in the object distance classification based on a main subdivision area to which a main object belongs.

The controller 17 calculates at the third step Q3 focus evaluation value variations F1, F2, F3 and brightness value variations Y1, Y2, Y3 for every class CL1, CL2, and CL3. The focus evaluation value variation can be calculated by comparing the focus evaluation value for an in-focus image with the reference value of the focus evaluation value in the reference value memory 24. Differences between the focus evaluation value and the reference value is calculated for the respective subdivision areas and are summed to be a focus evaluation value variation. Similarly, the brightness value variation is calculated by comparing the brightness value for an in-focus image with the reference value of the brightness in the reference value memory 24.

The controller 17 calculates at the fourth step Q4 an index value S for a compositional change on the basis of the weights, the focus evaluation value variations, and the brightness value variations. This index value S is calculated, for example, according to the following formula:

$$S=(WF1*F1+WF2*F2+WF3*F3)+WY(WY1*Y1+WY2*Y2+WY3*Y3)$$

where WY denotes the weight of the brightness value with respect to the focus evaluation value. If the calculated index value S is determined to be greater than a predetermined threshold R at the fifth step Q5, a compositional change is detected at the sixth step Q6. If the calculated index value S is determined to be the predetermined threshold R or less, no compositional change is determined to occur at the seventh step Q7. A compositional change is detected based on weights as well as focus evaluation and brightness value variations.

Figure 10:
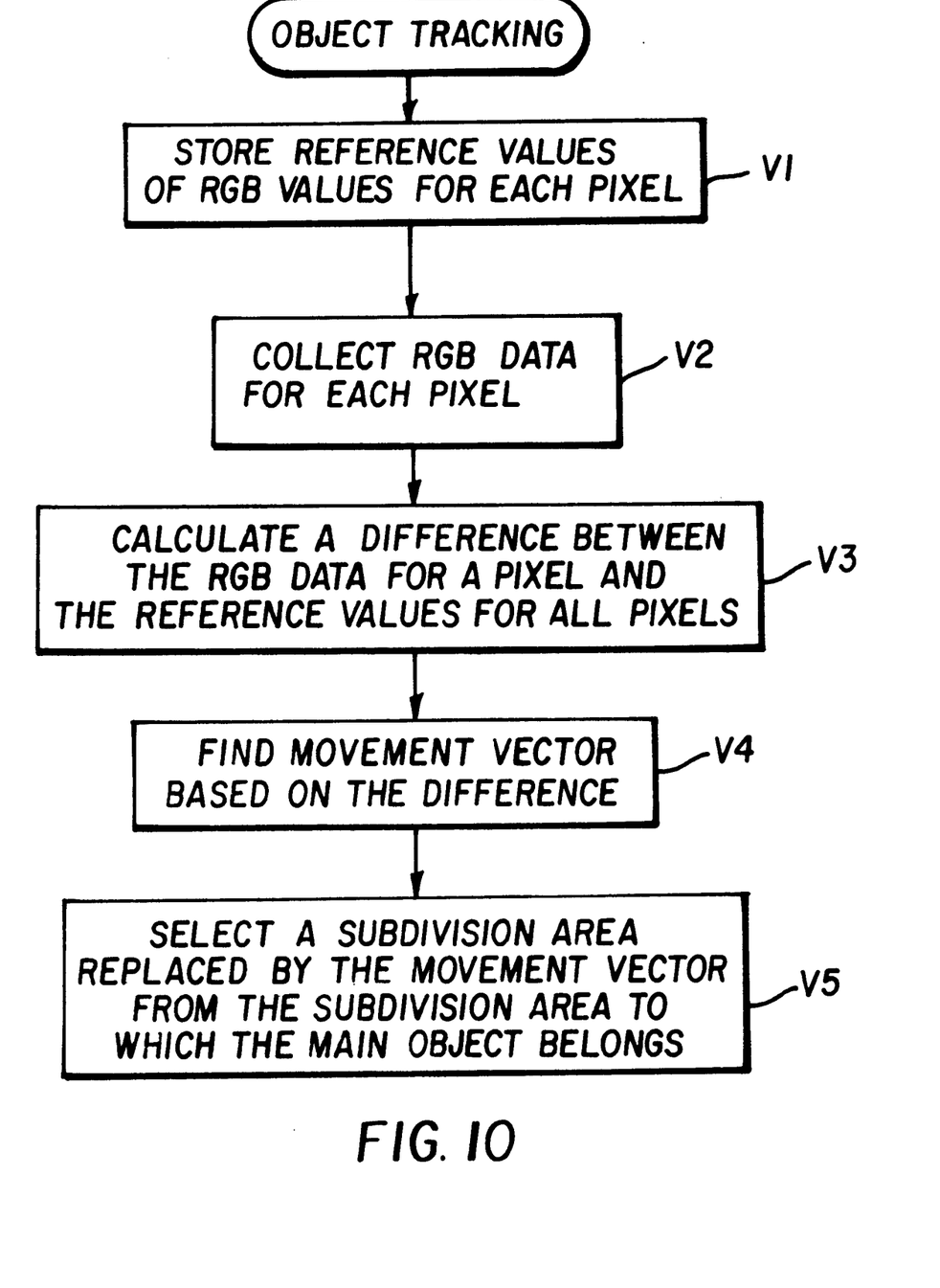
FIG. 10 is a flowchart illustrating the procedure of object tracking.
Figure 11:
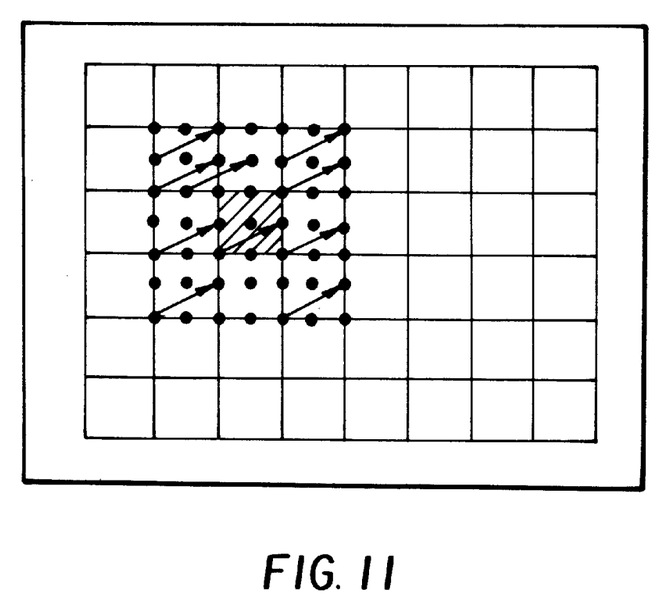
FIG. 11 is an illustration for explaining an object tracking operation using RGB data.

The operation of the sixth step S6 in FIG. 3 may be replaced with an object tracking in FIG. 10. This object tracking first executes at the preparation step V1 RGB values for a plurality of pixels within the main subdivision area G(3,4) of an in-focus image as reference values, in addition to the reference values at the fourth step P4 in FIG. 7, to the reference value memory 24. FIG. 11 illustrates a plurality of pixels arranged at equal intervals. Corresponding pixels in the subdivision areas surrounding the main subdivision area G(3,4) is selected for the plurality of pixels in the subdivision area G(3,4). RGB values for the corresponding pixels are also stored in the reference value memory 24.

The current RGB data is collected at the second step V2 for each pixel corresponding to the pixels which the reference values have been taken for. Differences are calculated at the third step V3 between the current RGB data for each pixel and the reference values of all pixels. Assume that the current RGB has the smallest deviation to the reference value of the pixel replaced by two pixels in the x axis and one pixel in the y axis. The existence of such deviation is stored at an address Diff[2,1]. The pixels with the smallest difference between the current RGB data and reference value are specified for all of the pixels at the fourth step V4. A vector for the specified pixel is determined as a movement vector. A subdivision area is selected at the fifth step V5 by displacement by the movement vector from the subdivision area to which the main object belongs.

With the above object tracking, focusing is performed based on the detected direction and amount of movement of an object so that a continuous focus on the main object can be kept, even if the main object moves from edge to edge in the image screen. Once an object is captured, the object can accordingly be tracked, regardless of changes in the foreground or background or changes in the image such as an introduction of another object.

What is claimed is:

1. A method of detecting a compositional change in an image, comprising:

obtaining an electrical signal corresponding to an illuminance of the image formed by a focusing lens using a photoelectric detector;

dividing the image into a plurality of subdivision areas;

calculating, for each of the subdivision areas, a focus evaluation value representative of an amount of high frequency component contained in the electrical signal and a brightness value representative of a brightness of the image;

storing as reference values a focus evaluation value and a brightness value of the image in focus;

sorting the subdivision areas according to an object distance classification;

weighting with different weights the subdivision areas in classes of the object distance classification based on a main subdivision area to which a main object belongs;

comparing the focus evaluation and brightness values after a focus with the reference values so as to calculate variation in the focus evaluation and brightness values; and detecting compositional changes based on the weights as well as the variation in the focus evaluation and brightness values.

2. The method according to claim 1, further comprising:

calculating an object distance for each subdivision area based on said focus evaluation value;

grouping the subdivision areas based on the object distances; and specifying the main subdivision area based on the result of said grouping.

3. The method according to claim 1, wherein in said weighting an identical weight is set for the main subdivision area and for a subdivision area adjacent the main subdivision area for containing a parallel object at an identical distance to the main object.

4. The method according to claim 1, wherein in said weighting said weights are changed at least in accordance with a focal length or diaphragm stop of the focusing lens.

5. The method according to claim 1, wherein extents of the classes in said object distance classification is changed at least in accordance with a focal length or diaphragm stop of the focusing lens.

6. The method according to claim 1, wherein in said weighting an isolated subdivision area and a bulk of subdivision areas are distinguished in the subdivision areas including a parallel object at an identical distance to the main object.

7. The method according to claim 1, wherein said reference values are average values of the focus evaluation and brightness values for a plurality of images succeeding the image in focus.

8. The method according to claim 1, wherein upon detection of a compositional change the focusing lens is moved over a partial range including the lens position for focusing the image, object distances for the respective subdivision areas are calculated based on focus evaluation values obtained during movement of the focusing lens, the subdivision areas are grouped based on the object distances, and a main subdivision area to which the main object belongs is specified based on the result of said grouping.

9. The method according to claim 8, wherein said partial range is determined at least in accordance with a focal length or diaphragm stop of the focusing lens.

10. The method according to claim 1, wherein upon detection of a compositional change an amount of movement of the object is detected on the basis of correlation between color information for a plurality of pixels in an image in a previous focus and color information for corresponding pixels in an image at the detection, and the main subdivision area is specified based on the amount of movement.

* * * * *